(12) United States Patent
Kanungo et al.

(10) Patent No.: US 8,005,845 B2
(45) Date of Patent: Aug. 23, 2011

(54) SYSTEM AND METHOD FOR AUTOMATICALLY RANKING LINES OF TEXT

(75) Inventors: Tapas Kanungo, San Jose, CA (US); Donald Metzler, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 408 days.

(21) Appl. No.: 12/124,086

(22) Filed: May 20, 2008

(65) Prior Publication Data

US 2009/0292683 A1    Nov. 26, 2009

(51) Int. Cl.
    *G06F 17/30*    (2006.01)
(52) U.S. Cl. ...................................... 707/748
(58) Field of Classification Search ................. 707/706, 707/723, 735, 748, 769
    See application file for complete search history.

(56) References Cited

U.S. PATENT DOCUMENTS 7,634,474 B2 * 12/2009 Vassilvitskii et al. ................. 1/1

OTHER PUBLICATIONS

Yahoo—Google Search, http://www.google.com/search?hl=en&q=yahoo&btnG=Search&lr=, printed May 19, 2008, 2 pages.
San Francisco—Yahoo! Search Results, http://search.yahoo.com/search;ylt=A0oGkxkSDzJIuXUAQ8tXNyoA?p=san+francisco& . . . , printed May 19, 2008, 2 pages.

* cited by examiner

*Primary Examiner* — Fred I Ehichioya
(74) *Attorney, Agent, or Firm* — Weaver Austin Villeneuve & Sampson LLP

(57) ABSTRACT

Disclosed are apparatus and methods for ranking lines of text. In one embodiment, an intent of a query is ascertained. A relevance of each one of a plurality of lines of text of a document is determined based upon the intent of the query, content of the query, and content of each of the plurality of lines of text. The plurality of lines of text may then be ranked according to the determined relevance of each of the plurality of lines of text.

24 Claims, 8 Drawing Sheets

|  | Feature 1-404 How common each word in line is | Feature 2-406 Number of names in line | Feature 3-408 Position of line within document | Total query-independent relevance of line 410 |
|---|---|---|---|---|
| Line 1    402 |  |  |  |  |
| Line 2    402 |  |  |  |  |
| Line 3    402 |  |  |  |  |
| .... |  |  |  |  |
| Line n    402 |  |  |  |  |

*FIG. 4*

|  | Feature 1 - Percentage of query terms in line 604 | Feature 2 - Number of times query term is found in line 606 | Feature 3 – Is the query a substring of the line of text? 608 | Total relevance of line to query 610 |
|---|---|---|---|---|
| Line 1    602 |  |  |  |  |
| Line 2    602 |  |  |  |  |
| Line 3    602 |  |  |  |  |
| .... |  |  |  |  |
| Line n    602 |  |  |  |  |

*FIG. 6*

|  | Feature 1 - Does query include a name? 704 | Feature 2 - Click characteristics 706 | Feature 3 - Number of words in the query 708 | Intent 710 |
|---|---|---|---|---|
| Query 1   702 | | | | |
| Query 2   702 | | | | |
| Query 3   702 | | | | |
| .... | | | | |
| Query n   702 | | | | |

FIG. 7

SYSTEM AND METHOD FOR AUTOMATICALLY RANKING LINES OF TEXT

BACKGROUND OF THE INVENTION

The present invention relates generally to computer implemented ranking of lines of text.

When a user submits a search query via a search engine, search engine may present a list of search results. More specifically, the list of search results typically lists a plurality of documents that satisfy the search query. When the search engine is implemented via a web site, each of the documents may be identified by a corresponding Uniform Resource Locator (URL).

When the search engine generates a list of search results, the search engine typically generates a summary (i.e., abstract) of each document. Thus, for a single document, the search engine may present a title of the document, the summary that the web site has generated, and a URL at which the document may be accessed.

Unfortunately, the summary of a document is not always useful to the user submitting the search query. As a result, the user may unnecessarily click on documents that do not include the information sought by the user. Alternatively, the user may choose not to click on documents that might be helpful to the user.

In view of the above, it would be beneficial if the summary of a document could be generated in a more accurate manner in order to improve the user experience.

SUMMARY OF THE INVENTION

Apparatus and methods for ranking lines of text are disclosed. In accordance with various embodiments, the intent of a query is ascertained. A relevance of each one of a plurality of lines of text of a document is determined based upon the intent of the query, content of the query, and content of each of the plurality of lines of text. The plurality of lines of text may then be ranked according to the determined relevance of each of the plurality of lines of text.

In accordance with one embodiment, both a query-independent relevance and a query-dependent relevance of each of the lines of text are ascertained. A query-independent relevance of a line of text may be defined as a degree to which the line of text of the document summarizes the document. A query-dependent relevance of a line of text may be defined as a relevance of the line of text to the query. The relevance of a line of text may be determined based upon the query-independent relevance, the query-dependent relevance of the line of text, and the intent of the query.

In accordance with another embodiment, the query-independent relevance of a line of text may be established based upon various query-independent features that are analyzed within the line of text. Examples of query-independent features include the number of names in the line of text or the placement of the line of text within the document (e.g., with respect to other lines of text in the document). Similarly, the query-dependent relevance of a line of text may be established based upon various query-dependent features that are analyzed within the line of text. Examples of query-dependent features include the number of times each query term is found in the line of text or a percentage of the query terms that are found in the line of text.

In accordance with yet another embodiment, the intent of a query may be one of a variety of intents. For example, the intent of a query may be navigational if a user wishes to obtain directions to a particular destination. As another example, the intent of a query may be informational if the user wishes to merely obtain information regarding a particular topic.

In accordance with yet another embodiment, the query-independent relevance of a line of text, the query-dependent relevance of the line of text, and the intent of the query are expressed in the form of a numerical value. The relevance of each of the plurality of lines of text in a document may then be calculated based upon the intent of the query, the query-independent relevance of the corresponding line of text, and the query-dependent relevance of the corresponding line of text. For example, the intent of the query may determine the weighting of the query-independent relevance and the query-dependent relevance in the calculation of the relevance of a line of text.

In accordance with yet another embodiment, the lines of text of a document are ranked according to their relevance. Those lines of text that are most relevant may then be used to generate a summary of the document.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 4 is an example representation that may be generated by a query independent summarizer in order to ascertain the query-independent relevance of lines of a document.

FIG. 6 is an example representation that may be generated by a query dependent summarizer in order to ascertain the query-dependent relevance of lines of a document.

FIG. 7 is an example representation that may be generated in order to ascertain the intent of a query.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

A document typically includes a plurality of lines of text. Each line of text may be a sentence, which may include any number of characters. Alternatively, each line of text may include a set of characters that fills a single line of a page.

In order to generate a summary of a document to be presented in response to a search query, the summary may be generated from a subset of the lines in the document. In one embodiment, a "relevance" of each of the plurality of lines may be ascertained, as will be described in further detail below. The subset of lines having the most relevance may then be used to generate the summary. For example, the subset of lines may be presented in order of relevance.

Various embodiments enable a summary of a document to be generated based in part on the perceived intent of the query. More specifically, the perceived intent of a query may be used to assign a relevance to each of the plurality of lines in the document based upon the content of the query and the content of the plurality of lines in the document. In this manner, the relevance of the plurality of lines of text in the document may be used to identify a subset of the plurality of lines of text in the document to be used in the summary.

Figure 1:
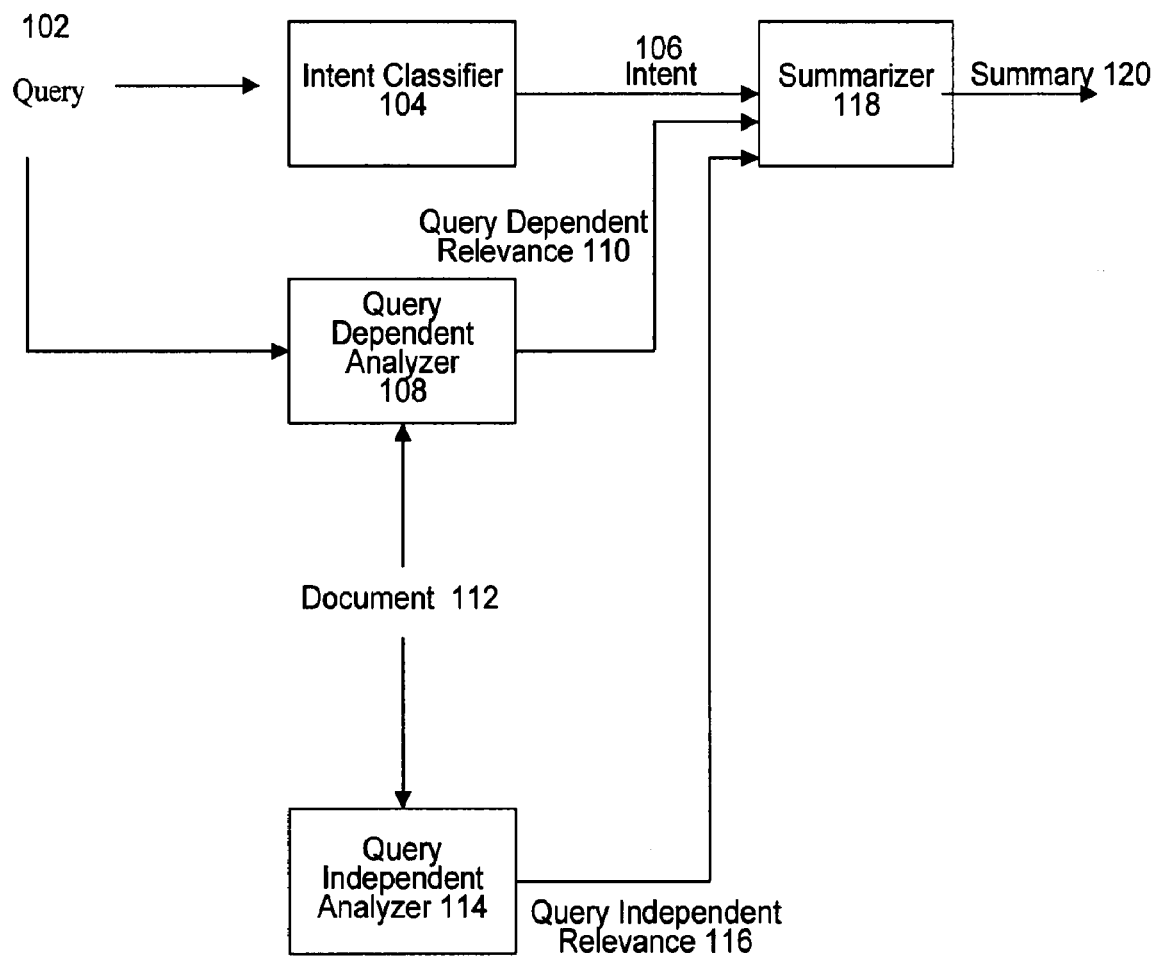
FIG. 1 is a block diagram illustrating an example system in which various embodiments of the invention may be implemented.

FIG. 1 is a block diagram illustrating an example system in which various embodiments of the invention may be implemented. When a query 102 is submitted by a user, an Intent Classifier 104 may classify the query 102 in order to determine an intent 106 of the query, as will be described in further detail below. For instance, the intent may be navigational or informational. Thus, the intent of the query may indicate a degree to which the query is navigational and/or informational. More specifically, a navigational query may be a query seeking directions to a specified destination (e.g., address or entity). Similarly, an informational query may be a query seeking information.

The intent 106 may be represented in the form of a numerical value, which may be a number between zero and one, inclusive. Thus, the numerical value may indicate both a degree to which the query is navigational and a degree to which the query is informational. For example, a number of zero may indicate that the query is entirely navigational, while a number of one may indicate that the query is entirely informational (or vice versa). Thus, where the numerical value is a number falling between zero and one, the numerical value may indicate the degree to which the query is navigational, as well as the degree to which the query is informational.

In addition, a Query Dependent Analyzer 108 may ascertain a query dependent relevance 110 of each of a plurality of lines of a document 112 based upon the query 102 and the document 112. For example, a data structure may be generated that includes each of the plurality of lines of the document 112 and a corresponding query dependent relevance 110 for each of the plurality of lines of the document 112, as will be described in further detail below. Each query dependent relevance value 110 may be represented in the form of a numerical value.

A Query Independent Analyzer 114 may determine a query independent relevance 116 of each of the plurality of lines of the document 112 based on the contents of the document 112. For example, a data structure may be generated that includes each of the plurality of lines of the document 112 and a corresponding query independent relevance 116 for each of the plurality of lines of the document 112, as will be described in further detail below. More specifically, the query independent relevance 116 of a line of text is determined solely based upon the contents of the document 112. In other words, the query independent relevance 116 of a line of text is not determined based upon the contents of the query 102. Each query independent relevance value 116 may be represented in the form of a numerical value.

A Summarizer 118 may generate a summary 120 of the document 112 based upon the intent 106, the query dependent relevance 110 of the lines of text of the document 112, and the query independent relevance 116 of the lines of text of the document 112. More specifically, the Summarizer 118 may generate a consolidated relevance value for each of the plurality of lines of text of the document 112 based upon the intent 106, the query dependent relevance 110 for the corresponding line of text, and the query independent relevance 116 for the corresponding line of text. The Summarizer 118 may then rank the plurality of lines of text according to their corresponding consolidated relevance values.

Figure 2A:
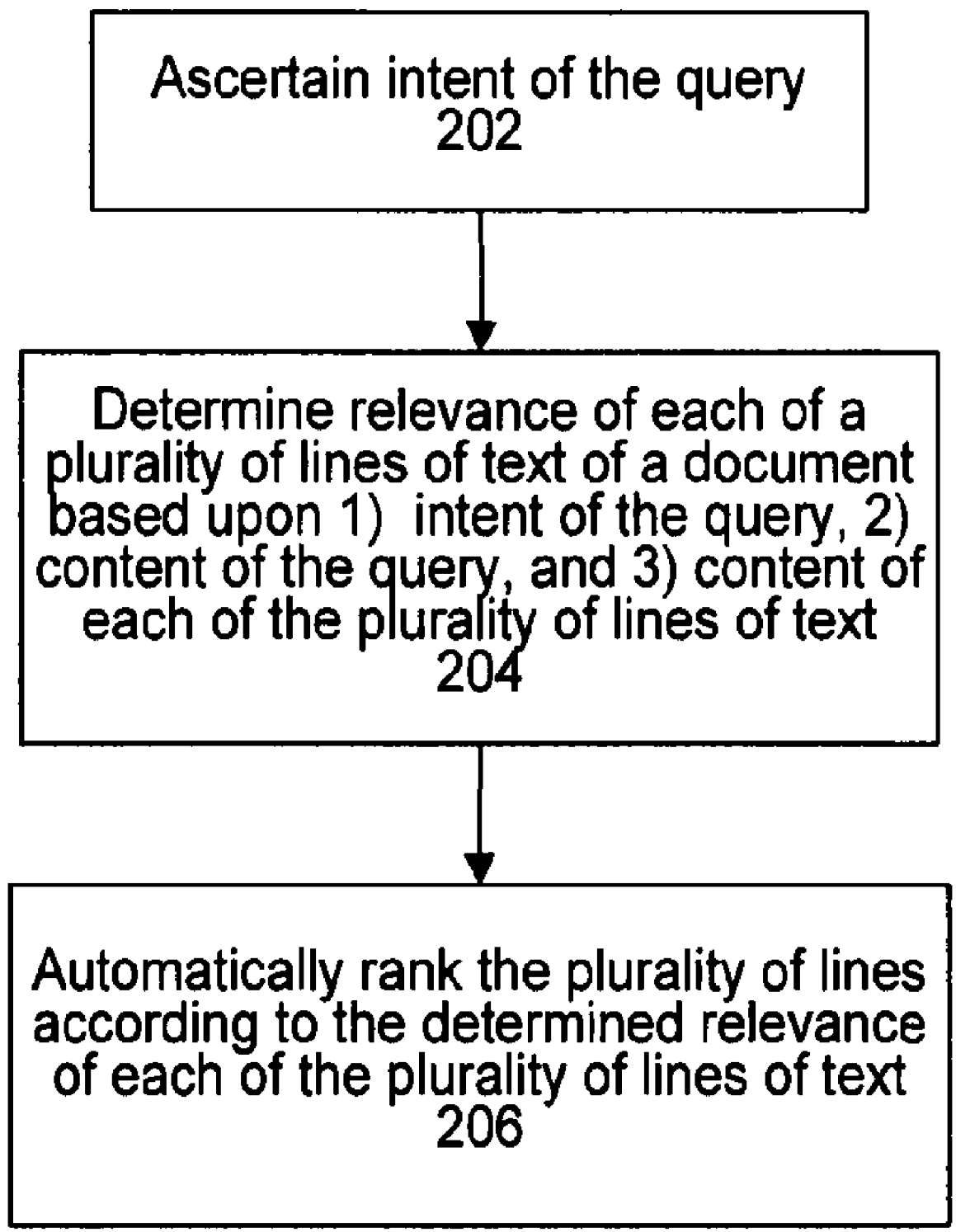
FIG. 2A is a process flow diagram illustrating a generalized method of ranking lines of a document according to the intent of a query in accordance with one embodiment of the invention.

FIG. 2A is a process flow diagram illustrating a generalized method of ranking lines of a document according to the intent of a query in accordance with one embodiment of the invention. A perceived intent of a query may be ascertained at 202. A relevance of each of a plurality of lines of text of a document may be determined based upon the intent of the query, content of the query, and content of each of the plurality of lines of text at 204. The plurality of lines of text may then be ranked according to the determined relevance of each of the plurality of lines of text at 206. In this manner, the plurality of lines may be ranked or sorted. A summary may then be generated using a subset of the plurality of lines that have been determined to have the greatest relevance.

The subset of lines that are used to generate a summary may be selected based upon the desired length of the summary. The desired length of the summary may be a pre-determined length, where the pre-determined length is a number of lines or characters. The pre-determined length may be ascertained based upon a variety of factors, such as the source of the query. For example, where the query has been received from a mobile device such as a cell phone, it may be desirable to generate a shorter summary. As a result, the pre-determined length may be selected from a set of pre-determined lengths appropriate for a variety of circumstances.

Figure 2B:
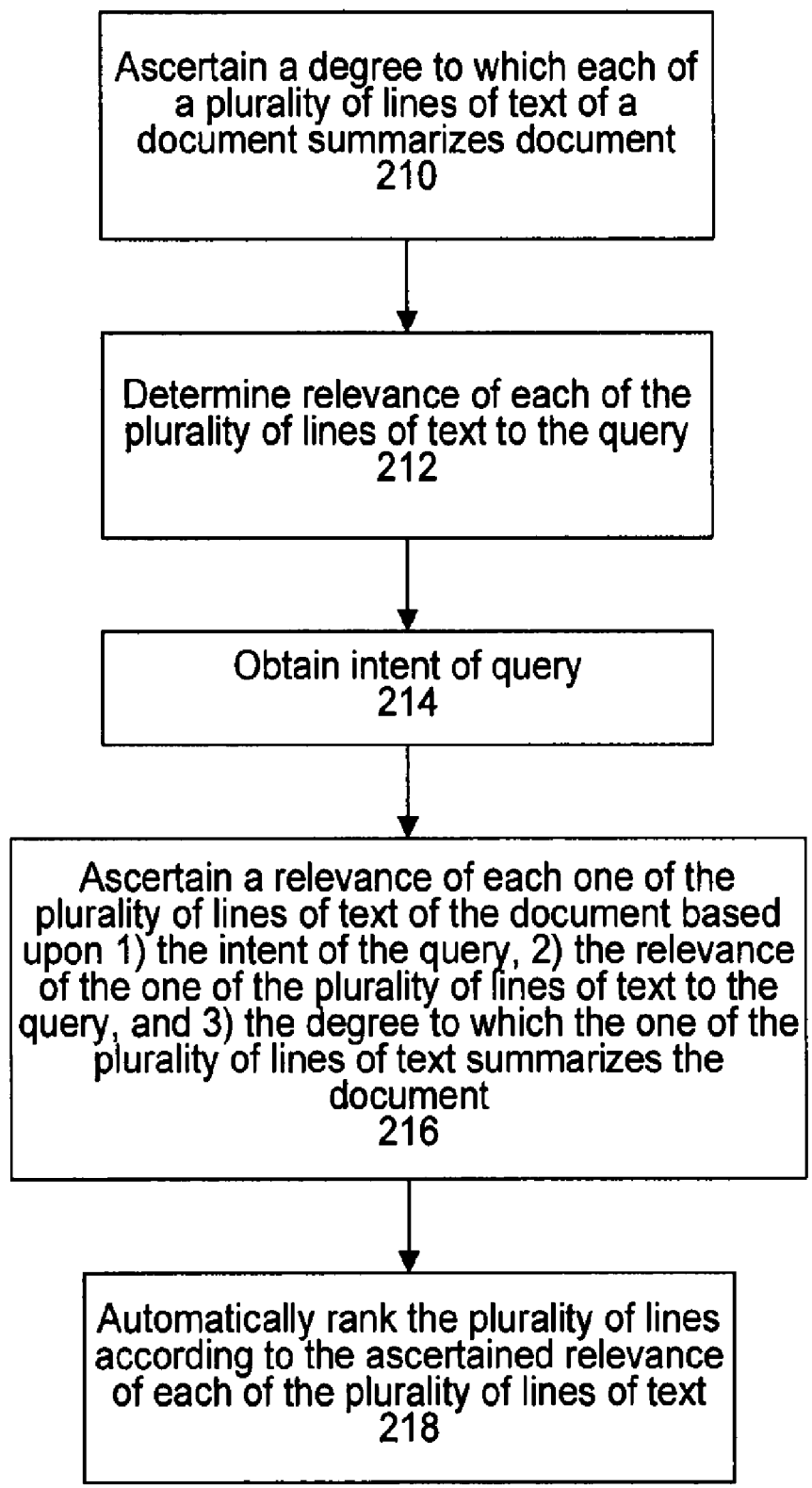
FIG. 2B is a process flow diagram illustrating a specific method of ranking lines of a document according to the intent of a query in accordance with one embodiment of the invention.

FIG. 2B is a process flow diagram illustrating a specific method of ranking lines of a document according to the intent of a query in accordance with one embodiment of the invention. A degree to which each of a plurality of lines of text of a document summarizes the document may be ascertained at 210. A relevance of each of the plurality of lines of text to the query may also be ascertained at 212. An intent of the query may be ascertained at 214. A relevance of each of the plurality of lines of text of the document may then be ascertained at 216 based upon 1) the intent of the query, 2) the relevance of the corresponding one of the plurality of lines of text to the query, and 3) the degree to which the corresponding one of the plurality of lines of text summarizes the document. The plurality of lines may then be automatically ranked at 218 according to the ascertained relevance of each of the plurality of lines of text. A summary of the document may then be generated using a subset of the plurality of lines of text based upon the ranking of the plurality of lines of text.

Figure 2C:
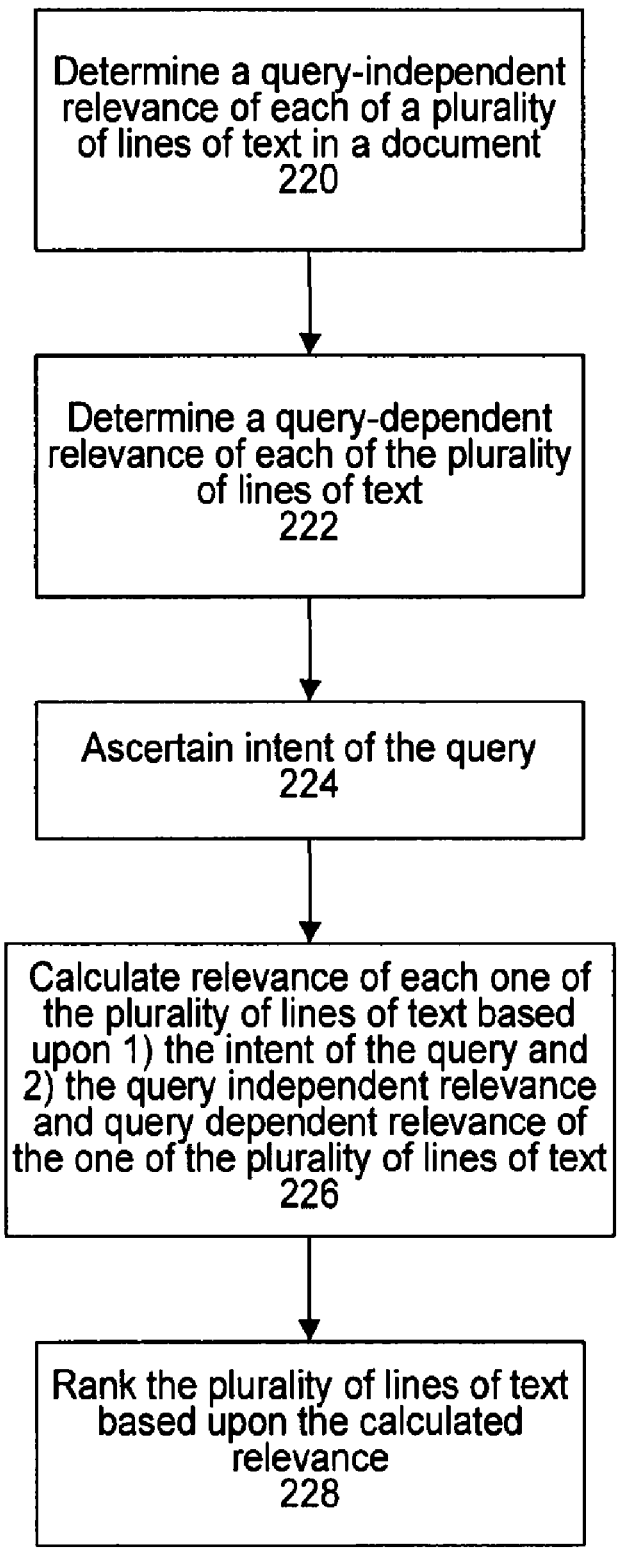
FIG. 2C is a process flow diagram illustrating a specific method of ranking lines of a document according to the intent of a query in accordance with one embodiment of the invention.

FIG. 2C is a process flow diagram illustrating a specific method of ranking lines of a document according to the intent of a query in accordance with one embodiment of the invention. A query-independent relevance of each of a plurality of lines of text in a document may be ascertained at 220. A query-dependent relevance of each of the plurality of lines of text may be ascertained at 222. An intent of the query may be ascertained at 224. A relevance of each one of the plurality of lines of text may be calculated based upon the intent of the query, the query independent relevance of the corresponding one of the plurality of lines of text and the query dependent relevance of the corresponding one of the plurality of lines of text at 226. The plurality of lines of text may be ranked based upon the calculated relevance at 228. A summary of the document may then be generated using a subset of the plurality of lines of text based upon the ranking of the plurality of lines of text.

Figure 3:
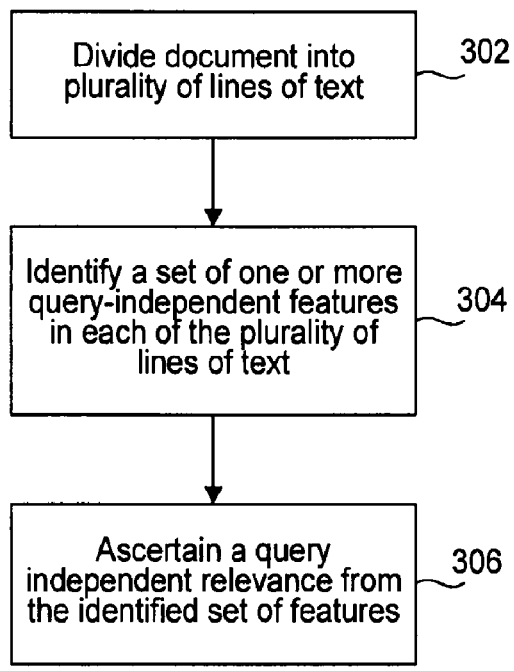
FIG. 3 is a process flow diagram illustrating a method of ascertaining a query independent relevance of lines of a document in accordance with one embodiment of the invention.

FIG. 3 is a process flow diagram illustrating a method of ascertaining a query independent relevance of lines of a document as shown at 220 of FIG. 2C in accordance with one embodiment of the invention. In order to ascertain a query-independent relevance of the lines of text in a document, the query-independent summarizer may divide the document into a plurality of lines of text at 302. The query-independent summarizer may then identify a set of one or more query-independent features in each of the plurality of lines of text at 304. The query-independent summarizer may then ascertain a query-independent relevance from the identified set of query-independent features at 306, as will be described in further detail with reference to FIG. 4.

FIG. 4 is an example representation that may be generated by a query independent summarizer in order to ascertain the query-independent relevance of lines of a document as described above with reference to FIG. 3. The representation may be generated in the form of a data structure such as a table. In this example, each row (i.e., entry) 402 in the table corresponds to a different line of the document. Each of the set of query-independent features may be represented by a different column of the table. Specifically, each of the set of query-independent features may identify a different piece of query-independent data collected from a line. In other words, each of the set of query-independent features is not dependent upon a query that has been submitted.

Examples of various query-independent features are shown as Features 1-3. Specifically, Feature 1 404 indicates how common one or more words in the line are. For instance, a database may be accessed to ascertain a frequency with which various words are typically used. Of course, such determinations may exclude various words, such as "the," "and," and "or." Feature 2 406 indicates a number of names in the corresponding line. For instance, the existence of one or more names may indicate greater relevance of the line to the document. Feature 3 408 indicates a position of a line within the document. More specifically, placement of a line within the document may indicate importance and therefore relevance of the line to the document. For example, the position of the line within the document may indicate that the line falls within the beginning of the document, the middle of the document, the end of the document, the first line of a paragraph, the middle of a paragraph, or the last line of a paragraph. Thus, one or more query independent features may indicate whether the line of text is the first line of a paragraph and/or whether the line of text is the first line of the document. Each of the features 404-408 of a line may be represented by a numerical value.

It is important to note that the features 404-408 are merely examples, and therefore other query-independent features may be considered in addition to, or instead of, those shown in FIG. 4. For instance, one or more query independent features may indicate the number of words in the line of text and/or the number of common words (e.g., a, and, the) in the line of text.

From the identified features 404-408, a total query-independent relevance 410 of a line may be ascertained. For example, the total query-independent relevance 410 of a line may be calculated using numerical values for the identified features 404-408 for that line. Alternatively, values of the features for a line may be used to ascertain the line's query-independent relevance via a lookup table or pattern matching. For example, the pattern of values of the features for a line may be matched against a set of rules and/or patterns stored in a file or database. The set of rules and/or patterns may be manually configured and/or may be system generated. Moreover, the system may learn further rules and/or patterns. For example, the system may generate various rules and/or patterns from a pre-configured set of rules and/or patterns. As another example, the system may generalize rules and/or patterns from various examples. For instance, the system may analyze a document and corresponding abstract to identify which lines of the document were used to generate the abstract, enabling the system to generate a set of rules and/or patterns that may be used to identify these lines.

Figure 5:
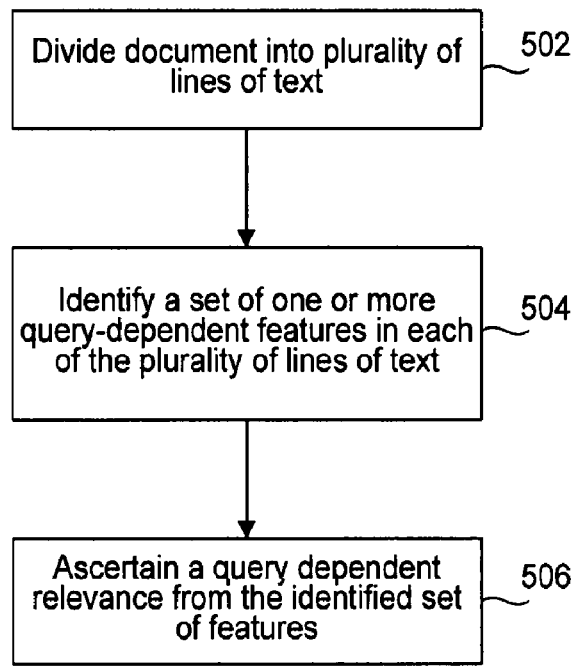
FIG. 5 is a process flow diagram illustrating a method of ascertaining a query dependent relevance of lines of a document in accordance with one embodiment of the invention.

FIG. 5 is a process flow diagram illustrating a method of ascertaining a query dependent relevance of lines of a document as shown at 222 of FIG. 2C in accordance with one embodiment of the invention. In order to ascertain a query-dependent relevance of the lines of text in a document, the query-dependent summarizer may divide the document into a plurality of lines of text at 502. The query-dependent summarizer may then identify a set of one or more query-dependent features in each of the plurality of lines of text at 504. The query-dependent summarizer may then ascertain a query-dependent relevance from the identified set of query-dependent features at 506, as will be described in further detail with reference to FIG. 6.

FIG. 6 is an example representation that may be generated by a query dependent summarizer in order to ascertain the query-dependent relevance of lines of a document as described above with reference to FIG. 5. The representation may be generated in the form of a data structure such as a table. In this example, each row (i.e., entry) 602 in the table corresponds to a different line of the document. Each of the set of query-dependent features may be represented by a different column of the table. Specifically, each of the set of query-dependent features may identify a different piece of query-dependent data collected from a line using the submitted query.

Examples of various query-dependent features are shown as Features 1-2. Specifically, Feature 1 604 indicates a percentage of the query terms that are found in the corresponding line. Feature 2 606 indicates a number of times a particular query term is found in the line. Thus, feature 2 606 may be ascertained for each of the query terms in the previously submitted query. Feature 3 608 may indicate whether the query is a substring of the line of text. It is important to note that the query-dependent features described with reference to FIG. 6 are merely examples. Therefore, other query-dependent features such as the percentage of query terms and their synonyms that occur in the line of text may also be considered. Each of the features 604-608 of a line may be represented by a numerical value.

From the identified features 604-608, a total query-dependent relevance 610 of a line may be ascertained. For example, the total query-dependent relevance 610 of a line may be calculated using numerical values for the identified features 604-608 for that line. Alternatively, a pattern of values of the features for a line may be used to ascertain its relevance. For example, the pattern of values of the features for a line may be matched against a set of rules and/or patterns stored in a file or database. The set of rules and/or patterns may be manually configured and/or may be system generated. Moreover, the system may learn further rules and/or patterns. For example, the system may generate various rules and/or patterns from a pre-configured set of rules and/or patterns. As another example, the system may generalize rules and/or patterns from various examples. For instance, the system may analyze a document and corresponding abstract to identify which lines of the document were used to generate the abstract, enabling the system to generate a set of rules and/or patterns that may be used to identify these lines.

FIG. 7 is an example representation that may be generated in order to ascertain the intent of a query as set forth above with reference to 224 of FIG. 2C. The representation may be generated in the form of a data structure such as a table. In this example, each row (i.e., entry) 702 in the table corresponds to a different query. Each of a set of features used to determine the intent of a query may be represented by a different column of the table.

Examples of various features used to determine the intent of a query are shown as Features 1-2. Specifically, Feature 1 704 indicates whether the query includes one or more names. More specifically, the inclusion of a name in a query may indicate that the query is navigational, rather than informational. Thus, one or more features may indicate whether the query contains an organization name and/or a product name. Feature 2 706 indicates click characteristics associated with the query. For instance, the click characteristics may indicate the percentage of times that a user will click on a document corresponding to the name provided in the query when the query is submitted. Feature 3 708 may indicate the number of words in the query. Each of the features 704-708 of a line may be represented by a numerical value.

From the identified features 704-708, an intent 710 of a query may be ascertained. For example, the intent 710 of a query may be calculated using numerical values for the identified features 704-708 for the corresponding line. Alternatively, a pattern of values of the features for a line corresponding to a query may be used to ascertain a corresponding intent. For example, the pattern of values of the features for a query may be matched against a set of rules and/or patterns stored in a file or database. The set of rules and/or patterns may be manually configured and/or may be system generated. Moreover, the system may learn further rules and/or patterns. For example, the system may generate various rules and/or patterns from a pre-configured set of rules and/or patterns. As another example, the system may generalize rules and/or patterns from various examples.

In one embodiment, the intent of the query is represented by a numerical value. For instance, the intent of the query may be represented by a value between zero and one, inclusive. In a specific embodiment, where the value is equal to one, the intent of the query is navigational and where the value is equal to zero, the intent of the query is informational. Alternatively, it is possible to assign a value of one to informational queries and a value of zero to navigational queries.

Once the query-independent relevance of a line, the query-dependent relevance of a line, and the intent of the query have been ascertained, a total relevance of the line may be calculated as set forth above with reference to 226 of FIG. 2C. In one embodiment, this may be accomplished by applying the following Equation:

$$\alpha F_I(1) + (1-\alpha) F_Q(1,q) = \text{Relevance},$$

where $\alpha$=Intent of query $F_I(1)$=Query-independent relevance of line, based upon contents of the line $F_Q(1,q)$=Query-dependent relevance of line, based upon contents of the line and the query Thus, in this example, the calculation of the relevance of a line will yield a numerical value between zero and one, where the value indicates a degree to which the intent of the query is informational and/or navigational. In this manner, the intent of a query may be used to assign a "weighting value" to the query-dependent relevance and the query-independent relevance of a line of text in order to ascertain a total relevance of the line of text.

Embodiments of the present invention may be employed in any of a wide variety of computing contexts to ascertain the relevance of lines of text to a document, ranking the lines of text of the document according to the ascertained relevance and/or generate a summary of the document using a subset of the lines of text of the document according to the manner in which they have been ranked. For example, as illustrated in FIG. 8, implementations are contemplated in which the relevant population of users interact with a diverse network environment via any type of computer (e.g., desktop, laptop, tablet, etc.) 1002, media computing platforms 1003 (e.g., cable and satellite set top boxes and digital video recorders), handheld computing devices (e.g., PDAs) 1004, cell phones 1006, or any other type of computing or communication platform.

And according to various embodiments, input that is processed in accordance with the invention may be obtained using a wide variety of techniques. For example, a user search query may be obtained from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

Figure 8:
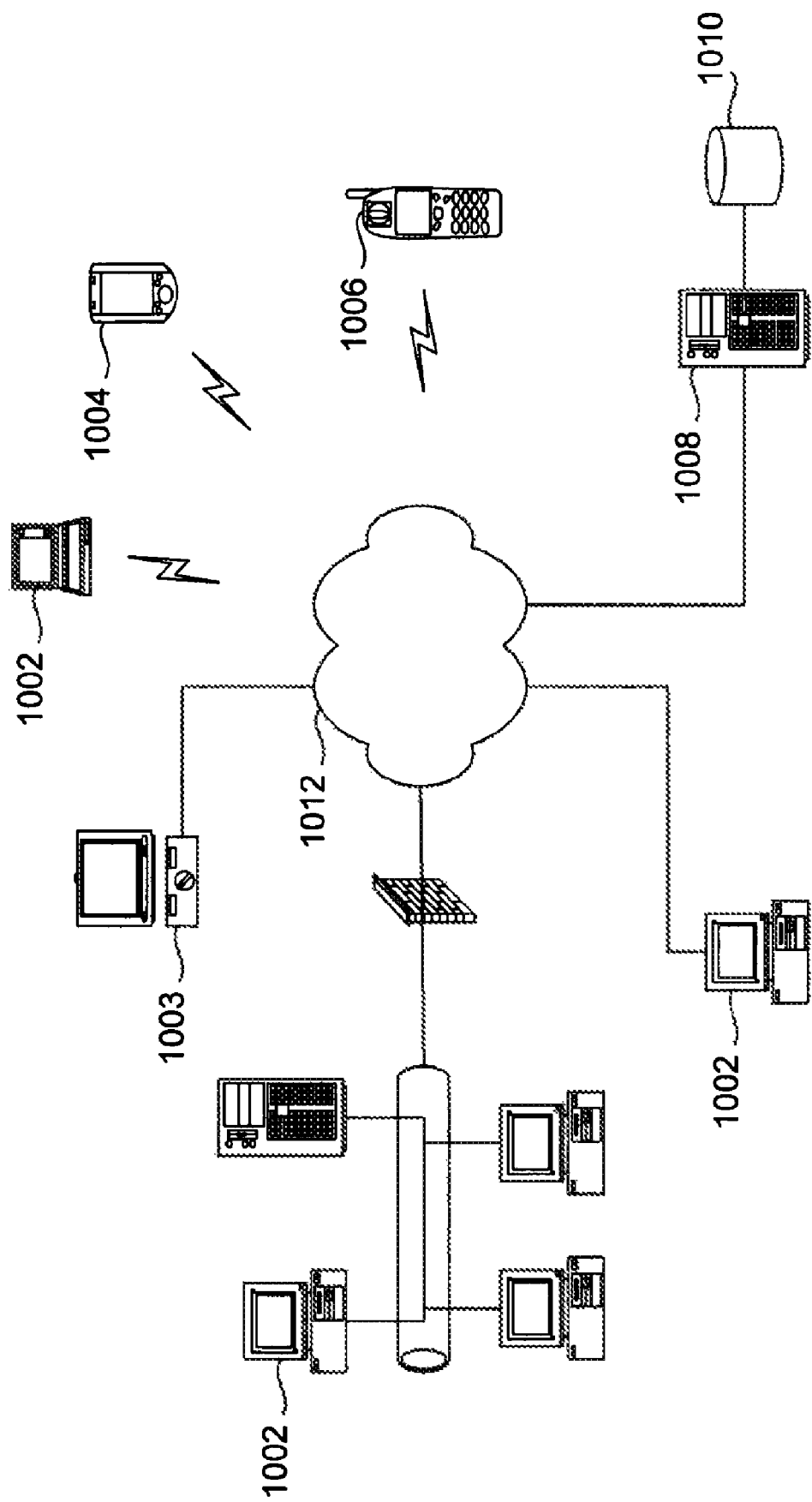
FIG. 8 is a simplified diagram of a network environment in which specific embodiments of the present invention may be implemented.

This is represented in FIG. 8 by server 1008 and data store 1010 which, as will be understood, may correspond to multiple distributed devices and data stores. The invention may also be practiced in a wide variety of network environments (represented by network 1012) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The line ranking and summary generating apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store data structures for analyzing query-dependent features and query-independent features of lines of text, rules and/or patterns for analyzing various query-dependent features for generating a query-dependent relevance, rules and/or patterns for analyzing various query-independent features for generating a query-independent relevance, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    ascertaining an intent of a query;
    determining by a processor a relevance of each one of a plurality of lines of text of a document based upon the intent of the query, content of the query, and content of each of the plurality of lines of text, wherein the document is a single search result returned in response to the query;
    ranking the plurality of lines of text according to the determined relevance of each of the plurality of lines of text; and
    generating a summary of the single search result using a subset of the plurality of lines of text based upon the ranking of the plurality of lines of text.

2. The method as recited in claim 1, wherein determining a relevance of each one of a plurality of lines of text of a document based upon the intent of the query, content of the query, and content of each of the plurality of lines of text comprises:
    ascertaining a degree to which each of the plurality of lines of text of the document summarizes the document;
    determining a query-dependent relevance of each of the plurality of lines of text to the query; and
    ascertaining the relevance of each one of the plurality of lines of text of the document based upon the intent of the query, the query-dependent relevance of the one of the plurality of lines of text to the query, and the degree to which the one of the plurality of lines of text summarizes the document.

3. The method as recited in claim 1, wherein determining a relevance of each one of a plurality of lines of text of a document based upon the intent of the query, content of the query, and content of each of the plurality of lines of text comprises:
    determining a query-independent relevance of each of the plurality of lines of text in the document;
    determining a query-dependent relevance of each of the plurality of lines of text in the document; and
    calculating the relevance of each one of the plurality of lines of text based upon the intent of the query, the query independent relevance of the one of the plurality of lines of text in the document and the query dependent relevance of the one of the plurality of lines of text in the document.

4. The method as recited in claim 3, wherein determining a query-independent relevance of each of the plurality of lines of text in the document includes identifying a set of one or more query-independent features in each of the plurality of lines of text in the document, and wherein determining a query-dependent relevance of each of the plurality of lines of text in the document includes identifying a set of one or more query-dependent features in each of the plurality of lines of text in the document.

5. The method as recited in claim 1, further comprising:
    presenting the summary of the document in association with a Uniform Resource Locator (URL) of the document.

6. The method as recited in claim 1, wherein the intent of the query indicates a degree to which the query is navigational or informational.

7. The method as recited in claim 1, wherein ascertaining the intent of the query comprises:
    obtaining a numerical value that indicates both a degree to which the query is navigational and a degree to which the query is informational.

8. The method as recited in claim 7, wherein the numerical value is a number between zero and one.

9. An apparatus, comprising:
    a processor; and
    a memory, at least one of the processor or the memory being adapted for:
        ascertaining an intent of a query;
        determining a relevance of each one of a plurality of lines of text of a document based upon the intent of the query, content of the query, and content of each of the plurality of lines of text, wherein the document is a single search result returned in response to the query;
        ranking the plurality of lines of text according to the determined relevance of each of the plurality of lines of text; and
        generating a summary of the single search result using a subset of the plurality of lines of text based upon the ranking of the plurality of lines of text.

10. The apparatus as recited in claim 9, wherein determining a relevance of each one of a plurality of lines of text of a document based upon the intent of the query, content of the query, and content of each of the plurality of lines of text comprises:

ascertaining a degree to which each of the plurality of lines of text of the document summarizes the document;

determining a query-dependent relevance of each of the plurality of lines of text to the query; and ascertaining the relevance of each one of the plurality of lines of text of the document based upon the intent of the query, the query-dependent relevance of the one of the plurality of lines of text to the query, and the degree to which the one of the plurality of lines of text summarizes the document.

11. The apparatus as recited in claim 9, wherein determining a relevance of each one of a plurality of lines of text of a document based upon the intent of the query, content of the query, and content of each of the plurality of lines of text comprises:

determining a query-independent relevance of each of the plurality of lines of text in the document;

determining a query-dependent relevance of each of the plurality of lines of text in the document; and calculating the relevance of each one of the plurality of lines of text based upon the intent of the query, the query independent relevance of the one of the plurality of lines of text in the document and the query dependent relevance of the one of the plurality of lines of text in the document.

12. The apparatus as recited in claim 11, wherein determining a query-independent relevance of each of the plurality of lines of text in the document includes identifying a set of one or more query-independent features in each of the plurality of lines of text in the document, and wherein determining a query-dependent relevance of each of the plurality of lines of text in the document includes identifying a set of one or more query-dependent features in each of the plurality of lines of text in the document.

13. The apparatus as recited in claim 9, wherein the intent of the query indicates a degree to which the query is navigational or informational.

14. The apparatus as recited in claim 9, wherein ascertaining the intent of the query comprises:

obtaining a numerical value that indicates both a degree to which the query is navigational and a degree to which the query is informational.

15. The apparatus as recited in claim 14, wherein the numerical value is a number between zero and one.

16. The apparatus as recited in claim 9, at least one of the processor or the memory being further adapted for performing the determining, ranking, and generating steps for each of a plurality of documents, the plurality of documents being search results returned in response to the query.

17. The apparatus as recited in claim 16, the method further comprising:

for each of the plurality of documents, presenting the summary and a Uniform Resource Locator (URL) of the corresponding one of the plurality of documents.

18. A computer-readable medium storing thereon computer-readable instructions, comprising:

instructions for ascertaining an intent of a query;

instructions for determining a relevance of each one of a plurality of lines of text of a document based upon the intent of the query, content of the query, and content of each of the plurality of lines of text, wherein the document is a single search result returned in response to the query;

instructions for ranking the plurality of lines of text according to the determined relevance of each of the plurality of lines of text; and instructions for generating a summary of the single search result using a subset of the plurality of lines of text based upon the ranking of the plurality of lines of text.

19. The computer-readable medium as recited in claim 18, wherein the instructions for determining a relevance of each one of a plurality of lines of text of a document based upon the intent of the query, content of the query, and content of each of the plurality of lines of text comprises:

instructions for ascertaining a degree to which each of the plurality of lines of text of the document summarizes the document;

instructions for determining a query-dependent relevance of each of the plurality of lines of text to the query; and instructions for ascertaining the relevance of each one of the plurality of lines of text of the document based upon the intent of the query, the query-dependent relevance of the one of the plurality of lines of text to the query, and the degree to which the one of the plurality of lines of text summarizes the document.

20. The computer-readable medium as recited in claim 18, wherein the instructions for determining a relevance of each one of a plurality of lines of text of a document based upon the intent of the query, content of the query, and content of each of the plurality of lines of text comprises:

instructions for determining a query-independent relevance of each of the plurality of lines of text in the document;

instructions for determining a query-dependent relevance of each of the plurality of lines of text in the document; and instructions for calculating the relevance of each one of the plurality of lines of text based upon the intent of the query, the query independent relevance of the one of the plurality of lines of text in the document and the query dependent relevance of the one of the plurality of lines of text in the document.

21. The computer-readable medium as recited in claim 20, wherein determining a query-independent relevance of each of the plurality of lines of text in the document includes identifying a set of one or more query-independent features in each of the plurality of lines of text in the document, and wherein determining a query-dependent relevance of each of the plurality of lines of text in the document includes identifying a set of one or more query-dependent features in each of the plurality of lines of text in the document.

22. The computer-readable medium as recited in claim 18, wherein the intent of the query indicates a degree to which the query is navigational or informational.

23. The computer-readable medium as recited in claim 18, wherein ascertaining the intent of the query comprises:

obtaining a numerical value that indicates both a degree to which the query is navigational and a degree to which the query is informational.

24. The computer-readable medium as recited in claim 23, wherein the numerical value is a number between zero and one.

* * * * *